Oct. 18, 1966  G. L. FIELDSEN ETAL  3,279,744
VALVE ACTUATOR
Filed March 9, 1964  3 Sheets-Sheet 3
FIG_4_
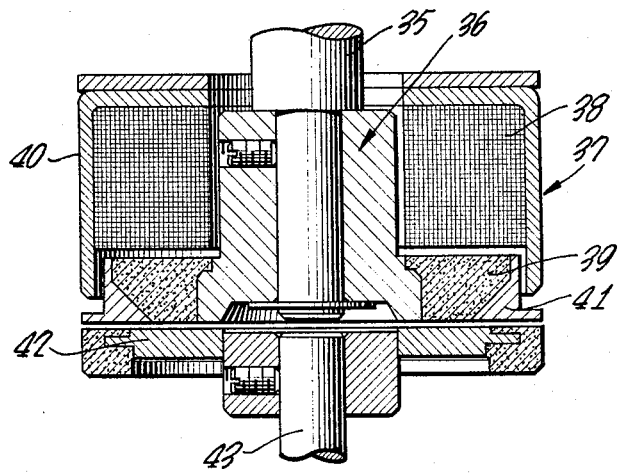
FIG_5_
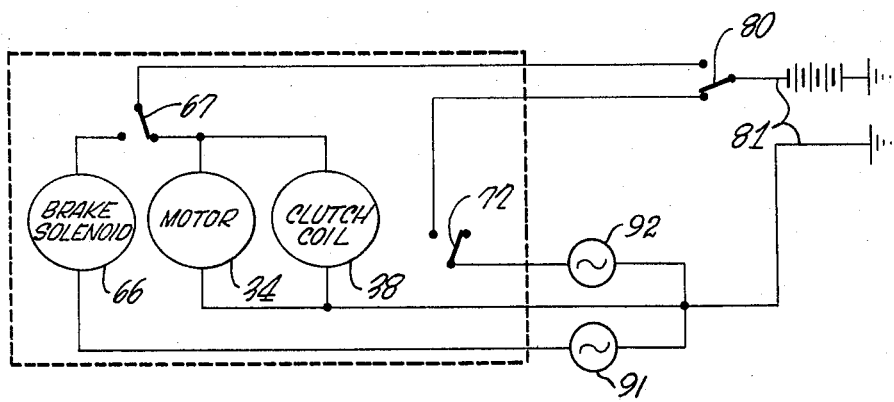
FIG_6_
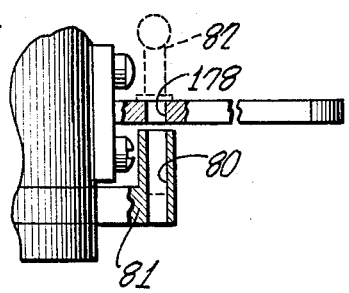
INVENTORS.
GEORGE L. FIELDSEN
PREBEN KENT
BY
ATTORNEY.

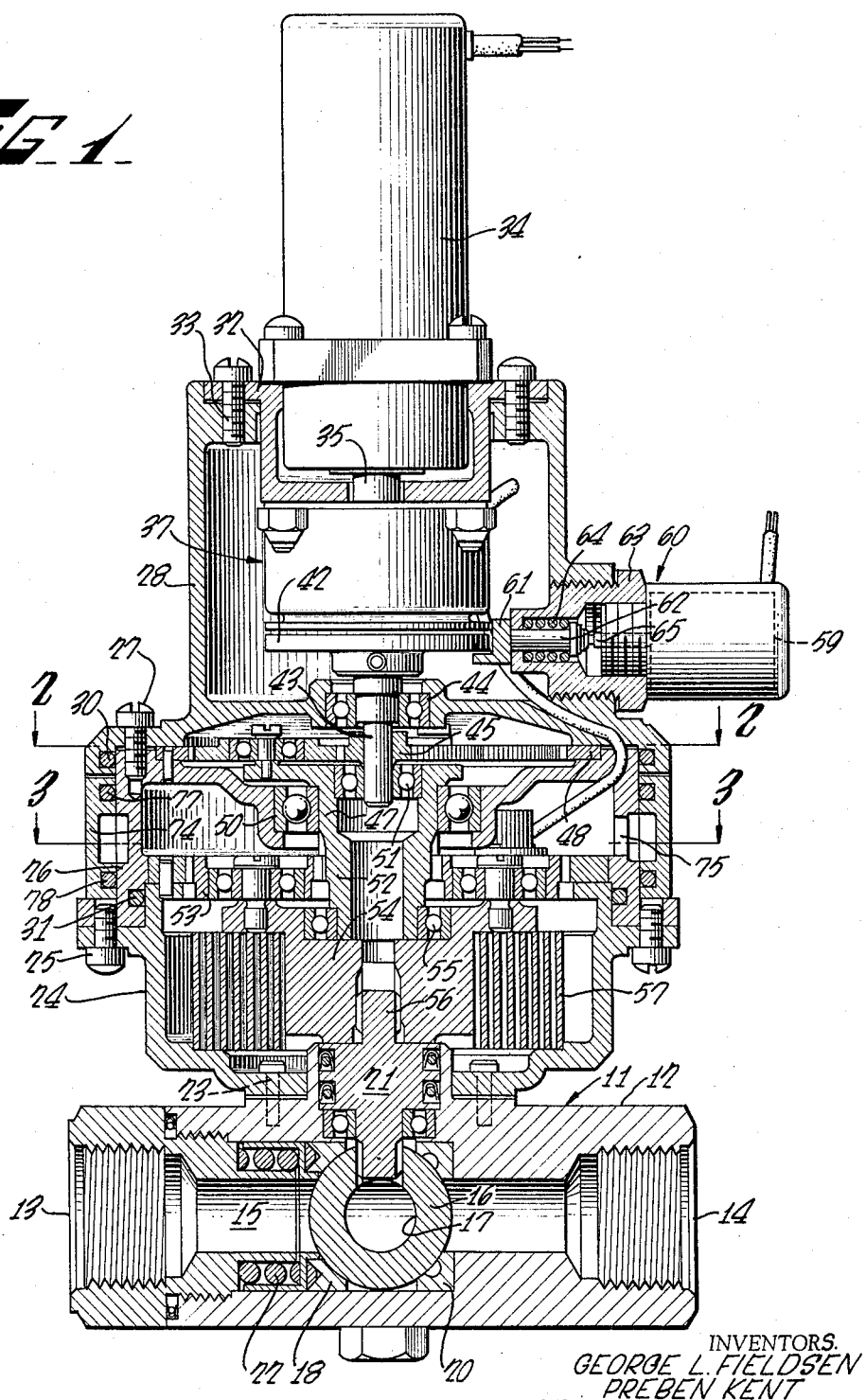

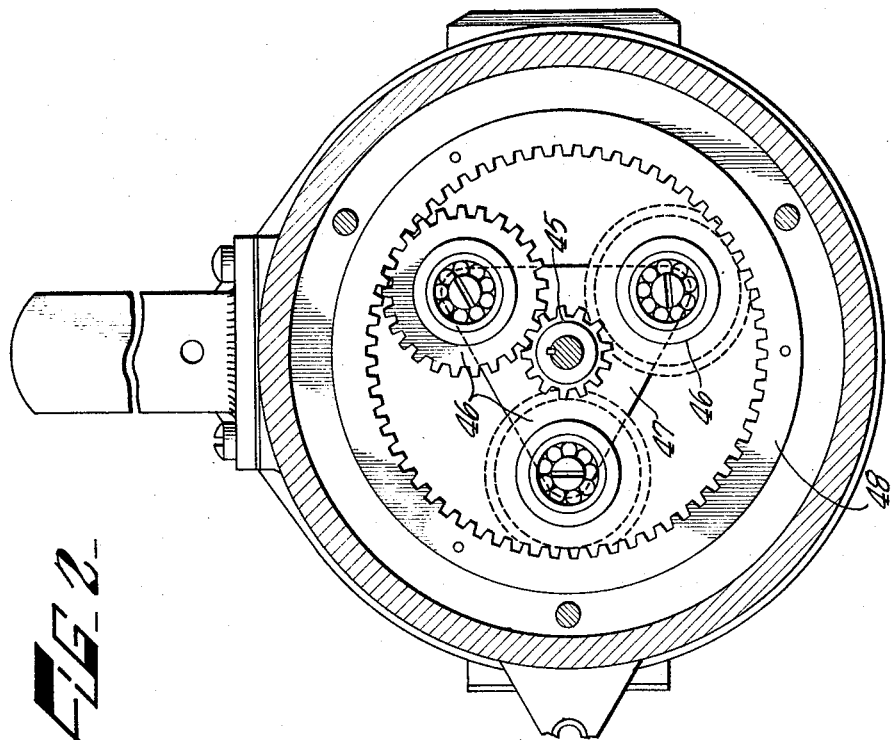
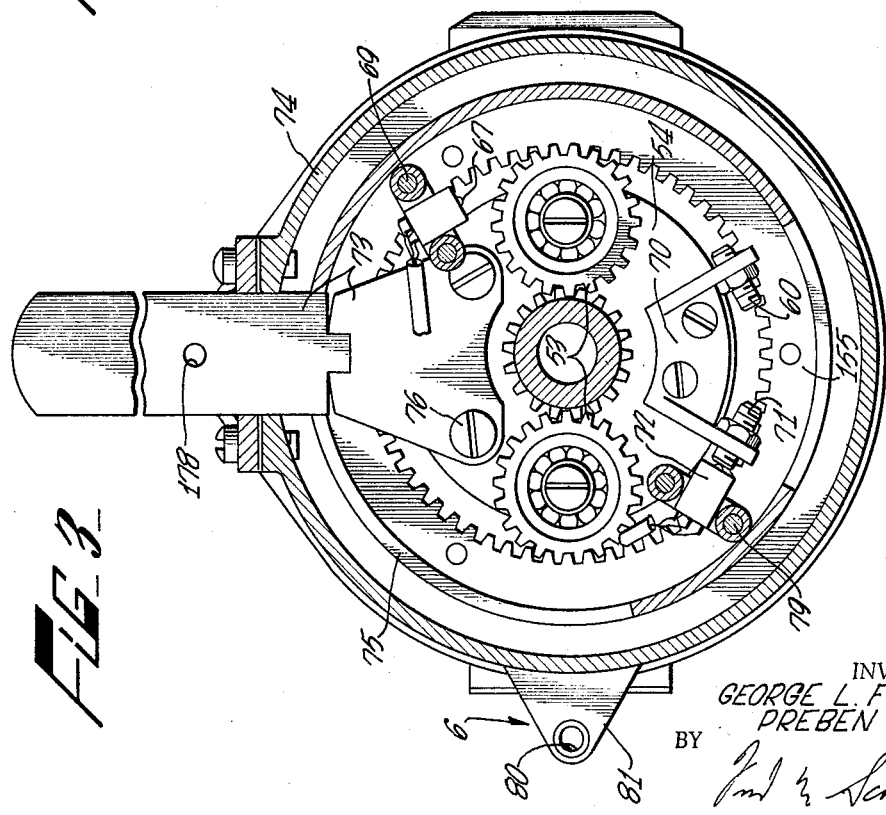

United States Patent Office 3,279,744
Patented Oct. 18, 1966

3,279,744
VALVE ACTUATOR
George L. Fieldsen, Saugus, and Preben Kent, Altadena, Calif., assignors to Clary Corporation, San Gabriel, Calif., a corporation of California
Filed Mar. 9, 1964, Ser. No. 350,284
2 Claims. (Cl. 251—130)

This invention relates to valves and has particular reference to a combined electrically and manually operable actuator for controlling a valve.

It is essential that valves used to control exotic or highly unstable fluids, as are used in rocket and missile applications, be highly reliable even under adverse operating conditions.

Further, it is desirable, especially in ground handling equipment, that such valves embody a fail-safe feature whereby loss of operating power for controlling a valve will result in automatic closing of the same or a return to a predetermined setting. Also, it is desirable that such a valve be capable of being controlled manually in the event of power failure.

Accordingly, it is a principal object of the present invention to provide an electric power operated actuator for valves which is effective to set the valve to a closed or other predetermined position upon power failure.

Another object is to provide a power operated valve of the above type which may be alternatively manually operated as, for example, in the event of power failure.

Another object is to provide an electric power operated valve which will return to closed position upon disconnection of the power supply either advertently or inadvertently.

Another object is to provide a highly reliable power operated valve.

A further object is to effectively seal a combined electrically and manually operable valve against corrosion and/or explosive fluids.

The manner in which the above and other objects of the invention are accomplished will be readily understood on reference to the following specification when read in conjunction with the accompanying drawings wherein:

FIG. 1 is a sectional view through a valve and actuator embodying a preferred form of the present invention.

FIG. 2 is a sectional plan view taken substantially along the line 2—2 of FIG. 1.

FIG. 3 is a sectional plan view taken substantially along the line 3—3 of FIG. 1.

FIG. 4 is a sectional view through the electrically operable clutch.

FIG. 5 is a schematic view illustrating the electric circuitry for controlling the valve actuator.

FIG. 6 is a fragmentary view taken in the direction of the arrow 6 in FIG. 3 showing the manually operable handle moved to its valve opening position.

Referring to the drawings, the valve chosen for illustration in association with the present invention is of the ball type. However, it is to be understood that the invention can be equally well applied to valves of other types and shapes.

The valve as shown comprises a valve housing 12 having ports 13 and 14 at opposite ends thereof communicating with opposite ends of a fluid passage 15. A ball valve element 16 having a passage 17 therethrough is located in the passage 15 and is engaged around diametrically opposite sides by annular seals 18 and 20. The ball element 16 is loosely splined to a drive shaft 21 and is thus floated between the seals 18 and 20. That is, due to the relatively loose connection between the ball and shaft 21, the ball can rock a slight amount about its splined connection with the shaft to permit a compression spring 22 to exert equal sealing force between the ball and the seals 18 and 20.

The valve housing 12 is attached by bolts 23 to a lower actuator housing part 24. The latter is attached by bolts 25 to an intermediate actuator housing part 26 which, in turn, is attached by bolts 27 to an upper actuator housing part 28.

O-ring seals 30 and 31 form effective fluid seals intermediate the housing parts 24, 26 and 28.

A cup-shaped adaptor 32 is attached to the housing part 28 by bolts 33 and supports an electric motor 34 having an output shaft 35 (see also FIG. 4) which is secured to the drive rotor 36 of an electrically operable clutch generally indicated at 37. The latter is the magnetic type comprising an electromagnetic coil 38 mounted in a stationary shell 40 of soft magnetic material, such as iron, which is suitably attached to the adaptor 32.

The rotor 36, also of soft magnetic material, has a flange part 39 of non-magnetic material, and an outer rim 41 of soft magnetic material.

The driven element of the clutch comprises a disc 42 of soft magnetic material attached to the upper end of a stub shaft 43 which is rotatably mounted in a bearing 44 carried by the housing part 28 and is slidably keyed to a sun gear 45, permitting a slight axial movement of the shaft 43 and disc 42.

As best seen in FIG. 2, the sun gear 45 meshes with a set of planetary gears 46 rotatably supported for orbital movement about the sun gear by the upper flanged portion of a gear member 47. The planetary gears mesh with a stationary internal ring gear 48 which is suitably secured between the housing parts 26 and 28.

The gear member 47 is rotatably mounted in a ball bearing 50 supported by an inwardly flanged portion of the intermediate housing part 26 and carries a ball bearing 51 which rotatably supports the lower end of the shaft 43 while permitting axial movement of this shaft.

The gear member 47 has a gear 52 integral therewith which meshes with planetary gears 53 (see also FIG. 3) which are rotatably supported by a hub 54 and, in turn, mesh with a stationary internal ring gear 155 which is suitably secured to the lower housing part 24.

The hub 54 is rotatably mounted on the gear member 47 through ball bearing 55 and is splined at 56 to the aforementioned shaft 21, thereby forming a driving connection with the ball member 16. The hub is attached in a suitable manner, not shown, to the inner end of a spiral coil spring 57 whose outer end is suitably attached to the inner periphery of the stationary lower housing part 24.

It will be seen from the foregoing description that energization of the clutch coil 38 will magnetically attract the driven disc 42 into engagement with the clutch rotor 36 to effect a driving connection between shafts 35 and 43, and concurrent energization of the motor 34 will transmit a drive through the clutch and sun gear 45, causing the planetary gears to orbit about shaft 43 and thus rotate gear member 47 at a reduced speed. Sun gear 52 on gear member 47 will, in turn, transmit an orbiting movement of the planetary gears 53 about the gear 155 to thus rotate the hub 54 at a still further reduced speed to rotate the ball element 16 of the valve toward open position and at the same time wind the torsion spring 57.

Means are provided to lock the valve in open position against the action of the spring 57 which tends to close the same. For this purpose, an electrically operable brake, generally indicated at 60, is provided, comprising a friction brake shoe 61 cooperable with the driven clutch disc 42. The brake comprises a friction brake shoe 61 mounted on a shaft 62 which is slideable endwise in an adaptor 63 screw threaded into the upper housing part 28. A compression spring 64 normally maintains the shoe 61 out of frictional engagement with the disc 42.

A solenoid 59 is supported by the plug 63 and, when energized, the armature 65 thereof engages the shaft 62 to force the shoe 61 into braking engagement with the disc 42 and rim 41, thus braking the motor and holding the ball element 16 in position against the action of spring 57.

As shown in FIG. 5, the brake solenoid 66 is in circuit with a single pole, double throw switch 67 (see also FIG. 3) which is suitably supported by bolts 69 from the intermediate housing part 26. The switch 67 is arranged to be thrown from its position illustrated in FIG. 5 to its alternate position, when the valve is moved to fully open position, by an adjustable actuator screw 60 mounted on a bracket 70 attached to the hub 54.

A second actuator screw 71 is mounted on the bracket 70 and normally engages a second switch 72, also suitably supported from the intermediate housing part 26 by bolts 79. The screw 71 normally holds switch 72 in its position illustrated in FIG. 5 when the valve is open but permits it to move to its alternate position upon movement of the valve toward closed position.

Means are provided for manually opening the valve in the event of electrical power failure or whenever it is desired to operate the valve without using electrical power. As shown in FIG. 3, a handle unit 73 is suitably secured to a protective band or sleeve 74 surrounding the housing part 26. The handle unit extends through an arcuate slot 75 in the housing part 26 and is secured by screws 76 to the upper portion of the hub 54.

The sleeve 74 is slideably fitted over a cylindrical portion of the housing part 26 and straddles the slot 75 therein. O-ring seals 77 and 78 are mounted in the sleeve 74 above and below the slot 75 to effectively seal the interior of the actuator against any corrosive and/or explosive fumes or liquids.

The slot 75 extends sufficiently to permit movement of the handle to fully open the valve 11, and in order to lock the valve in its open condition against the action of the spring 57, the handle is provided with a hole 178 (see also FIG. 6) which, when the handle is moved to such fully open position, registers with a hole 80 formed in a bracket 81 extending outwardly from the intermediate housing part 26. A pin, indicated by dot-dash lines 82, is then fitted through both holes to lock the handle in place.

*Operation*

When it is desired to open the valve under electrical power, a single pole, double throw switch 80 (FIG. 5) is thrown from its illustrated position to its alternate position, thereby applying current from a power circuit 81 through switch 67 and the motor 34 and clutch coil 38, the latter two elements being in parallel.

Since the brake solenoid is now de-energized, the clutch 37 will couple the motor 34 to the drive train and the motor 34 will drive the train to move the ball element 16 toward open position. As the hub 54 rotates, the switch actuator 71 recedes from the switch 72, permitting the same to move to its alternate position from that shown in FIG. 5.

When the ball element 16 reaches its fully open position, the switch actuator 60 will engage the switch 67 to move the same to its alternate position, thus de-energizing the motor and clutch and energizing the brake solenoid 66. Accordingly, the brake will arrest the drive train to hold the ball element in open condition against retrograde rotation by spring 57. At this time an indicator light 91 in series with the solenoid 66 is illuminated indicating that the valve is open.

When it is desired to close the valve, the switch 80 is moved to its position shown in FIG. 5, thereby permitting the brake solenoid to become de-energized and allowing the spring 57 to return the ball element 16 to closed position. At this time, the switch 72 is in its alternate position from that shown in FIG. 5 and therefore a circuit is completed through a second indicator light 92 to illuminate the same, indicating that the valve is closed.

It will be noted that the brake solenoid is effective to lock the valve in open condition even if the ball element 16 is moved to such position manually as may be necessary in the event the motor or clutch malfunction.

Also, it will be noted that the spring 57 will be effective to automatically move the ball element 16 to closed position in the event the power circuit 81 fails or is disconnected.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A motor operated valve comprising a valve element movable between open and closed valve controlling positions,
   a motor,
   drive transmission means intermediate said motor and said valve element,
   a housing enclosing said transmission means,
   said housing having an opening in the side thereof,
   a manually operable handle operatively connected to said transmission means and extending through said opening,
   and a sleeve member surrounding said housing,
   said sleeve member being attached to said handle and movable relative to said housing upon movement of said handle,
   said sleeve straddling said opening and sealing the interior of said housing from the exterior thereof.

2. A motor operated valve comprising a valve element movable between open and closed valve controlling positions,
   a motor,
   drive transmission means including a speed reducing device intermediate said motor and said valve element;
   a housing enclosing said transmission means,
   said housing having an opening in the side thereof,
   a manually operable handle operatively connected to the output portion of said speed reducing device,
   said handle extending through said opening,
   and a sleeve surrounding said housing,
   said sleeve being attached to said handle and movable relative to said housing upon movement of said handle,
   said sleeve straddling said opening and sealing the interior of said housing from the exterior thereof.

References Cited by the Examiner

UNITED STATES PATENTS

| | | | |
|---|---|---|---|
| 2,052,929 | 9/1936 | Kronmiller | 251—71 X |
| 2,955,798 | 10/1960 | Sights | 251—340 X |
| 3,154,968 | 11/1964 | Daugherty | 74—625 |

M. CARY NELSON, *Primary Examiner.*

R. C. MILLER, *Assistant Examiner.*